(12) United States Patent
Shields et al.

(10) Patent No.: US 8,648,148 B2
(45) Date of Patent: Feb. 11, 2014

(54) LOW GLOSS MASS POLYMERIZED RUBBER-MODIFIED MONOVINYLIDENE AROMATIC COPOLYMER COMPOSITION

(75) Inventors: Nigel A. Shields, Terneuzen (NL); Dominique Maes, Lochristi (BE); Mary Ann Jones, Midland, MI (US); Thomas D. Traugott, Sanford, MI (US)

(73) Assignee: Styron Europe GmbH, Horgen (CH)

( * ) Notice: Subject to any disclaimer, the term of this patent is extended or adjusted under 35 U.S.C. 154(b) by 989 days.

(21) Appl. No.: 11/992,875

(22) PCT Filed: Oct. 5, 2006

(86) PCT No.: PCT/US2006/038883
§ 371 (c)(1),
(2), (4) Date: Mar. 28, 2008

(87) PCT Pub. No.: WO2007/047120
PCT Pub. Date: Apr. 26, 2007

(65) Prior Publication Data
US 2011/0040035 A1    Feb. 17, 2011

Related U.S. Application Data

(60) Provisional application No. 60/725,741, filed on Oct. 12, 2005.

(51) Int. Cl.
*C08L 33/20* (2006.01)
*C08L 33/18* (2006.01)
*C08L 53/00* (2006.01)

(52) U.S. Cl.
USPC ............ 525/282; 525/88; 525/238; 525/230; 525/205; 525/279; 525/293; 525/902; 524/504

(58) Field of Classification Search
USPC .......... 525/88, 238, 230, 205, 279, 293, 282, 525/902; 524/504
See application file for complete search history.

(56) References Cited

U.S. PATENT DOCUMENTS

| | | | |
|---|---|---|---|
| 3,509,237 A * | 4/1970 | Aubrey | 525/71 |
| 4,239,863 A * | 12/1980 | Bredeweg | 525/263 |
| 4,640,959 A | 2/1987 | Alle | |
| 4,771,107 A | 9/1988 | Hoenl | |
| 5,068,384 A | 11/1991 | Harris | |
| 5,212,240 A | 5/1993 | Dion et al. | |
| 5,302,663 A | 4/1994 | Eichenauer et al. | |
| 5,837,772 A | 11/1998 | McKee et al. | |
| 6,211,298 B1 * | 4/2001 | Vanspeybroeck et al. | 525/243 |
| 2003/0049452 A1 * | 3/2003 | Kosugi et al. | 428/412 |
| 2003/0055177 A1 * | 3/2003 | Demirors | 525/241 |
| 2004/0059031 A1 * | 3/2004 | Seidel et al. | 524/121 |

FOREIGN PATENT DOCUMENTS

| | | |
|---|---|---|
| EP | 0 103 657 A1 | 3/1984 |
| EP | 0 570 632 A | 11/1993 |
| WO | WO 99/23157 A | 5/1999 |
| WO | WO 00/24823 A | 5/2000 |
| WO | WO 01/48043 A | 7/2001 |
| WO | WO 03/011928 A | 2/2003 |

OTHER PUBLICATIONS

Modern Styrenic Polymers: Polystyrenes and Styrenic Copolymers Ed. J. Scheirs and D. B. Priddy, 2003.*
Joong-Hwan Choi, et al., Linear viscoelastic behavior of acrylonitrile-butadiene-styrene (ABS) polymers in the melt: Interpretation of data with a linear viscoelastic model of matrix/core-shell modifier polymer blends, Korea-Australia Rheology Journal, vol. 12, No. 2, Jun. 2000, pp. 135-141.
Y. Aoki, et al., Dynamic viscoelastic properties of polymers in the molten state. IV Effect of rubber particle size, Polym. J. 14, 951-958.

* cited by examiner

*Primary Examiner* — Mark Kaucher
(74) *Attorney, Agent, or Firm* — Brinks Gilson & Lione; Ryan L. Marshall

(57) ABSTRACT

Disclosed is a mass polymerized rubber-modified monovinylidene aromatic copolymer composition with an excellent balance of aesthetic, physical and mechanical properties, in particular good impact with low consistent gloss across an injection molded textured part, and a method for preparing such a composition.

20 Claims, No Drawings

LOW GLOSS MASS POLYMERIZED RUBBER-MODIFIED MONOVINYLIDENE AROMATIC COPOLYMER COMPOSITION

REFERENCE TO EARLIER FILED APPLICATIONS

This application is a 371 national phase of International Application No. PCT/US2006/038883, filed Oct. 5, 2006, and claims the benefit under 35 U.S.C. §119(e) of United States Provisional Application No. 60/725,741, filed Oct. 12, 2005, the disclosures of which are incorporated, in their entirety, by this reference.

FIELD OF THE INVENTION

This invention relates to a mass polymerized rubber-modified monovinylidene aromatic copolymer composition with an excellent balance of aesthetic, physical and mechanical properties, in particular, an improved combination of very low gloss which is consistent across the surface of a fabricated article and good impact resistance and a method for preparing such a composition and article.

BACKGROUND OF THE INVENTION

Many thermoplastics have a natural, high gloss finish when injection molded, particularly compositions containing styrenic polymers such as emulsion ABS polymers. For many applications, high gloss is a very desirable characteristic and it may be one of the most important factors in the selection of the material. On the other hand, for many other applications, such as automotive interior applications and information technology equipment, for example computer and other electronic equipment enclosures, there is a trend toward matte or low gloss finishes, principally for aesthetic reasons as well as for the elimination of costly coating and painting steps.

With the recent tendency toward non-coating finish of automotive interior trims such as instrument panels for the purpose of reducing the production costs, there are rapidly growing demands for developing interior parts having excellent appearance such as good low gloss giving improved safety as well as relaxed feeling by reducing light reflection. In addition, the recent tendency to produce interior parts, such as instrument panels, air bag covers and knee bolsters, from the same material creates demand for materials well-balanced in impact resistance and stiffness so as to meet minimum safety requirements.

One technique for obtaining low gloss is to use a mold with a textured and/or grained surface. Texture and/or grain containing molds are even used to mold low gloss materials in order to further accentuate the dull finish. However, even with a low gloss material a textured and/or grained mold may not provide optimum results because the parts do not always have a uniform gloss over a long run. The changes in temperature, internal cavity pressure, and shear rate along the fill path can result in varying degrees of gloss over the surface of the part.

Conventionally, low-cost, general-purpose propylene-based resins have been widely used as materials for automotive interior trims. Polypropylene-based resins naturally exhibit less gloss than some thermoplastic polymers. However, propylene-based resins are deficient in several properties, such as stiffness and scratch resistance. While stiffness and scratch resistance of propylene-based resins can be improved to some extent by the addition of fillers and other additives, the overall balance of properties for propylene-based resins are still unsatisfactory for interior automotive parts.

Other polymers can easily be made to exhibit low gloss by the introduction of one or more additional constituents, or matting agents. An example of such a polymer is high impact polystyrene which is made by mixing polybutadiene with polystyrene. The large domains of rubber within the polystyrene phase result in a low gloss material. However, as with propylene-based resins high impact polystyrene does not demonstrate the balance of properties needed for interior automotive parts. Furthermore, often these matting agents do not assure good replication of texture and/or grain.

Still another inherently low gloss thermoplastic is acrylonitrile, styrene, butadiene (ABS) copolymer made by the bulk, mass, mass-solution, or mass-suspension polymerization process. These processes involve the dissolving of polybutadiene in styrene and acrylonitrile monomers and the subsequent graft reaction between these monomers and the polybutadiene together with acrylonitrile monomer. At the end of the reaction, relatively large particles of rubber are created which may contain some occluded styrene-acrylonitrile copolymer. The large particle size of these rubbery domains is believed to be responsible for the low gloss surface finish of such products. Mass ABS provides an excellent balance of properties including ambient and low temperature impact, stiffness, inherently low gloss, chemical resistance and processability. However, conventional mass ABS resins can demonstrate gloss gradients over the length of an injection molded part, especially a part with texture and/or grain, due to an inherent gloss that is not low enough and to poor replication of the texture and/or grain.

Attempts to improve the ability for ABS to demonstrate very low gloss and a consistent gloss across the surface of a molded part with texture and/or grain have been made by blending ABS with one or more additional resin, such as polycarbonate (PC), polybutylene terephthalate (PBT), polyethylene terephthalte (PET), or polyamides. However, these blends typically result in increased resin cost, higher density, poorer low temperature impact, poorer dimensional stability, water sensitivity, require a compounding step, and/or molding instability at elevated temperatures.

In view of the deficiencies of the materials used for automotive interior parts or information technology equipment applications it would be desirable to have a resin which affords a good balance of properties such as processability, stiffness, impact resistance, and chemical resistance that affords a very low gloss and a consistent low gloss appearance across the surface of a fabricated article having texture and/or grain.

SUMMARY OF THE INVENTION

Accordingly, the present invention is such a desirable resin which affords a good balance of processability, stiffness, impact, and chemical resistance combined with a very low gloss and a consistent low gloss appearance across the surface of a fabricated article with a texture and/or grain. The following are embodiments of the present invention:

Embodiment 1. A mass polymerized rubber-modified monovinylidene aromatic copolymer composition comprising:
  (i) a continuous matrix phase comprising a copolymer of a monovinylidene aromatic monomer and an ethylenically unsaturated nitrile monomer having a weight average molecular weight of equal to or less than 150 kg/mole and (ii) a rubber component dispersed as discrete rubber particles in the matrix comprising having a polybutadiene content of at least 12 weight percent as determined by infrared analysis, wherein the rubber-modified monovinylidene aromatic copolymer has a storage modulus (G') of between 2,000 to 5,000 Pascals, the average rubber particle size is between 1.5 to 2 microns as determined by Coulter Counter, a tensile modulus of at least 1,400 MPa as determined by ISO 527-2, and a notched Charpy at 23° C. as determined by DIN 53453 of at least 11 kJ/m².

Embodiment 2. The mass polymerized rubber-modified monovinylidene aromatic copolymer composition of Embodiment 1 wherein the ethylenically unsaturated nitrile is from about 10 to about 35 weight percent of the copolymer.

Embodiment 3. The mass polymerized rubber-modified monovinylidene aromatic copolymer composition of Embodiment 1 wherein the monovinylidene aromatic monomer is styrene and the ethylenically unsaturated nitrile monomer is acrylonitrile.

Embodiment 4. The mass polymerized rubber-modified monovinylidene aromatic copolymer composition of Embodiment 1 further comprising a comonomer selected from n-butyl acrylate and/or N-phenyl maleimide.

Embodiment 5. The mass polymerized rubber-modified monovinylidene aromatic copolymer composition of Embodiment 1 wherein:
(i) the copolymer is present in an amount from about 60 to 90.5 weight percent and
(ii) the rubber component is present in an amount from about 40 to 9.5 weight percent,
wherein weight percents are based on the total weight of the rubber-modified monovinylidene aromatic copolymer.

Embodiment 6. The mass polymerized rubber-modified monovinylidene aromatic copolymer composition of Embodiment 1 wherein the polybutadiene rubber comprises a 1,3-butadiene homopolymer.

Embodiment 7. The mass polymerized rubber-modified monovinylidene aromatic copolymer composition of Embodiment 1 wherein the rubber component comprises a styrene and 1,3-butadiene block copolymer rubber.

Embodiment 8. The mass polymerized rubber-modified monovinylidene aromatic copolymer composition of Embodiment 1 wherein the rubber particles have an average particle size from about 1.5 micrometers to about 1.9 micrometers.

Embodiment 9. The mass polymerized rubber-modified monovinylidene aromatic copolymer composition of Embodiment 1 wherein the rubber particles have an average particle size from about 1.6 micrometers to about 2 micrometers.

Embodiment 10. The mass polymerized rubber-modified monovinylidene aromatic copolymer composition of Embodiment 1 wherein the G' is between 2,000 to 4,500 Pascals.

Embodiment 11. The mass polymerized rubber-modified monovinylidene aromatic copolymer composition of Embodiment 1 wherein continuous matrix phase has a weight average molecular weight of equal to or less than 135 kg/mole.

Embodiment 12. The mass polymerized rubber-modified monovinylidene aromatic copolymer composition of Embodiment 1 further comprising a polycarbonate resin.

Embodiment 13. The mass polymerized rubber-modified monovinylidene aromatic copolymer composition of Embodiment 12 is a PC/ABS blend.

Embodiment 14. A method for preparing a mass polymerized rubber-modified monovinylidene aromatic copolymer composition comprising the steps of:
(a) polymerizing by bulk, mass-solution or mass-suspension polymerization techniques in the presence of a dissolved rubber component a monovinylidene aromatic monomer and an ethylenically unsaturated nitrile monomer, optionally in the presence of an inert solvent, forming a continuous matrix phase to the desired degree of conversion wherein
  (i) the continuous matrix phase has a weight average molecular weight of equal to or less than 150 kg/mole and
  (ii) the rubber component is dispersed as discrete rubber particles in the matrix comprising and has a polybutadiene content of at least 12 weight percent as determined by infrared analysis,
(b) subjecting the resultant mixture to conditions sufficient to remove any unreacted monomers and to cross-link the rubber, and
(c) isolating the rubber-modified monovinylidene aromatic copolymer composition,
wherein the rubber-modified monovinylidene aromatic copolymer has a storage modulus (G') of between 2,000 to 5,000 Pascals, the average rubber particle size is between 1.5 to 2 microns as determined by Coulter Counter, a tensile modulus of at least 1,400 MPa as determined by ISO 527-2, and a notched Charpy at 23° C. as determined by DIN 53453 of at least 11 kJ/m².

Embodiment 15. The method of Embodiment 14 wherein the monovinylidene aromatic monomer is styrene and the ethylenically unsaturated nitrile monomer is acrylonitrile.

Embodiment 16. A method for producing a molded or extruded article of a mass polymerized rubber-modified monovinylidene aromatic copolymer composition comprising the steps of:
(A) preparing a mass polymerized rubber-modified monovinylidene aromatic copolymer composition by:
  (a) polymerizing by bulk, mass-solution or mass-suspension polymerization techniques in the presence of a dissolved rubber component a monovinylidene aromatic monomer and an ethylenically unsaturated nitrile monomer, optionally in the presence of an inert solvent, forming a continuous matrix phase to the desired degree of conversion wherein
    (i) the continuous matrix phase has a weight average molecular weight of equal to or less than 150 kg/mole and
    (ii) the rubber component is dispersed as discrete rubber particles in the matrix comprising and has a polybutadiene content of at least 12 weight percent as determined by infrared analysis,
  (b) subjecting the resultant mixture to conditions sufficient to remove any unreacted monomers and to cross-link the rubber, and
  (c) isolating the rubber-modified monovinylidene aromatic copolymer composition,
  wherein the rubber-modified monovinylidene aromatic copolymer has a storage modulus (G') of between 2,000 to 5,000 Pascals, the average rubber particle size is between 1.5 to 2 microns as determined by Coulter Counter, a tensile modulus of at least 1,400 MPa as determined by ISO 527-2, and a notched Charpy at 23° C. as determined by DIN 53453 of at least 11 kJ/m² and
(B) molding or extruding said rubber-modified monovinylidene aromatic copolymer composition into a molded or extruded article.

Embodiment 17. The method of Embodiment 16 wherein the molded or extruded article is an automotive part, an information technology equipment part, or a sheet.

Embodiment 18. The composition of Embodiment 1 in the form of a molded or extruded article.

Embodiment 19. The molded or extruded article of Embodiment 18 is an automotive part, an information technology equipment part, or a sheet.

DETAILED DESCRIPTION OF THE INVENTION

The surface appearance of a molded article may vary, for instance it may be smooth, textured, contain a grain, or combinations there of. The surface of a molded article is a negative version (sometimes referred to as reverse or mirror image) of the surface of the mold which defines the mold cavity from which the molded article is produced. For an article having a smooth surface, the mold surface is polished. As used herein, a texture is any macro surface appearance on the molded article, such as a pattern, structure, scheme, etc. wherein the depth of the texture pattern in the mold surface is measured in millimeters, for example from about 0.2 to about 2 millimeters. As used herein, a grain is a micro surface appearance on the molded article, such as roughness, wherein the depth of the grain pattern in the mold is measured in micrometers, for example from about 1 to about 100 micrometers.

Suitable rubber-modified monovinylidene aromatic copolymers employed in the present invention comprise a monovinylidene aromatic and ethylenically unsaturated nitrile copolymer in a matrix or continuous phase and rubber particles dispersed in the matrix. The matrix or continuous phase of the present invention is a copolymer comprising polymerized therein a monovinylidene aromatic monomer and an ethylenically unsaturated nitrile monomer or a copolymer comprising polymerized therein a monovinylidene aromatic monomer, an ethylenically unsaturated nitrile monomer and one or more vinyl monomer that can be copolymerized with them. Copolymer, as used herein, is defined as a polymer having two or more monomers interpolymerized. These compositions are generically known as SAN-type or SAN since poly (styrene-acrylonitrile) is the most common example.

Various techniques suitable for producing rubber-modified monovinylidene aromatic copolymer are well known in the art. Examples of these known polymerization processes include bulk, mass-solution, or mass-suspension polymerization, generally known as mass polymerization processes. For a good discussion of how to make rubber-modified monovinylidene aromatic copolymer see "Modern Styrenic Polymers" of *Series In Polymer Science* (Wiley), Ed. John Scheirs and Duane Priddy, ISBN 0 471 497525. Also, for example, U.S. Pat. Nos. 3,660,535; 3,243,481; and 4,239,863, which are incorporated herein by reference.

In general, continuous mass polymerization techniques are advantageously employed in preparing the rubber-modified monovinylidene aromatic copolymer of the present invention. Preferably, the polymerization is conducted in one or more substantially linear, stratified flow or so-called "plug-flow" type reactor such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which stirred tank reactor is generally employed in combination with one or more plug-flow type reactors. Alternatively, a parallel reactor set-up, as taught in EP 412801, may also be suitable for preparing the rubber-modified monovinylidene aromatic copolymer of the present invention.

Multizone plug flow bulk processes include a series of polymerization vessels (or towers), consecutively connected to each other, providing multiple reaction zones. A rubber, for example butadiene rubber (stereospecific) is dissolved in a mixture of monovinylidene aromatic comonomers, for example styrene (ST) and acrylonitrile (AN), and the rubber solution is then fed into the reaction system. The polymerization can be thermally or chemically initiated, and viscosity of the reaction mixture will gradually increase. During the reaction course, the rubber will be grafted with ST/AN polymer (grafted SAN) and, in the rubber solution, bulk SAN (referred to also as free SAN or matrix SAN or non-grafted SAN) is also being formed. At a point where the free SAN (that is, non-grafted SAN) can not be "held" in one single, continuous "phase" of rubber solution, it begins to form domains of SAN phase. The polymerization mixture now is a two-phase system. As polymerization proceeds, more and more free SAN is formed, and the rubber phase starts to disperse itself as particles (rubber domains) in the matrix of the ever-growing free SAN. Eventually, the free SAN becomes a continuous phase. This is actually a formation of an oil-in-oil emulsion system. Some matrix SAN is occluded inside the rubber particles as well. This stage is usually given a name of phase inversion. Pre-phase inversion means that the rubber is a continuous phase and that no rubber particles are formed, and post phase inversion means that substantially all of the rubber phase has converted to rubber particles and there is a continuous SAN phase. Following the phase inversion, more matrix SAN (free SAN) is formed and, possibly, the rubber particles gain more grafted SAN.

A feed with a functional monomer such as N-phenylmaleimide that increases the Tg of the matrix and also the heat resistance of the product can be added in one or more location throughout the polymerization process, the location(s) may be the same or different from where the styrene and acrylonitrile monomers are added, for example see U.S. Pat. Nos. 5,412,036 and 5,446,103, which are incorporated herein by reference.

When a desirable monomer conversion level and a matrix SAN of desired molecular weight distribution is obtained, the polymerization mixture is then subjected to conditions sufficient to cross-link the rubber and remove any unreacted monomer. Such cross-linking and removal of unreacted monomer, as well as removal of diluent or solvent, if employed, and other volatile materials is advantageously conducted employing conventional devolatilization techniques, such as introducing the polymerization mixture into a devolatilizing chamber, flashing off the monomer and other volatiles at elevated temperatures, for example, from 170° C. to 300° C. and/or under vacuum and removing them from the chamber. Finally, the polymer is extruded and bulk ABS pellets are obtained from a pelletizer.

The temperatures at which polylmerization is most advantageously conducted are dependent on a variety of factors including the specific initiator and type and concentration of rubber, comonomers, reactor set-up (for example, linear, parallel; recirculation, etc.), and reaction solvent, if any, employed. In general, polymerization temperatures from 60° C. to 160° C. are employed prior to phase inversion with temperatures from 100° C. to 190° C. being employed subsequent to phase inversion. Mass polymerization at such elevated temperatures is continued until the desired conversion of monomers to polymer is obtained. Generally, conversion (also sometimes referred to as percent solids) of from 55 to 90, preferably 60 to 85, weight percent of the monomers added to the polymerization system (that is, monomers added in the feed and any additional stream, including any recycle stream) to polymer is desired. Percent solids is the ratio of the weight of the solids (for example, rubber plus matrix (co) polymer) to the weight of the reaction mixture (for example, unpolymerized monomer(s)) expressed in percent at any specified time during the polymerization reaction.

To synthesize rubber-modified monovinylidene aromatic copolymer with high performance by the mass process, four aspects are essential among many others. These aspects are grafting of the rubber substrate prior to phase inversion, particle formation or sizing during phase inversion, building molecular weight and molecular weight distribution of the matrix, and cross-linking of the rubber particle at the completion point of the mass polymerization.

Alternatively, a combination of mass and suspension polymerization techniques are employed. Using said techniques, following phase inversion and subsequent size stabilization of the rubber particles, the partially polymerized product can be suspended with or without additional monomers in an aqueous medium which contains a polymerized initiator and polymerization subsequently completed. The rubber-modified monovinylidene aromatic copolymer is subsequently separated from the aqueous medium by acidification, centrifugation or filtration. The recovered product is then washed with water and dried.

The degree of low gloss and the consistency of the low gloss appearance of a fabricated article are influenced by (1) the inherent gloss of the material it is molded from and (2) how well the material replicates the texture and/or grain of the mold surface.

The gloss of an article made from a rubber-modified monovinylidene aromatic copolymer is partially the result of molding conditions under which the article is manufactured (for example, injection molded). However, for a given molding condition, the (average) rubber particle size (diameter) of the rubber-modified monovinylidene aromatic copolymer is a major contributing factor to its inherent gloss. Gloss tends to decrease with increasing particle size. Impact resistance is also related to rubber particle size. If the rubber particle size is too small or too large, impact is decreased. The rubber particle size is affected by many parameters, rubber viscosity, grafting, matrix viscosity, polymerization temperature, and shear to name a few.

Unless otherwise noted, specular gloss or gloss measurements reported herein are determined according to ISO 2813. Sample preparation for gloss determination is disclosed hereinbelow and the measuring step is performed on a Dr. Lange Reflectometer, type RB3 reflectometer. Specular gloss is defined as the ratio of the amount of light reflected, in the mirror direction, from the sample surface to the amount of light reflected from glass with a refractive index of 1.567, both measured under identical conditions. Inherent gloss may be determined according to the $Gloss_{bottom}$ method (disclosed hereinafter) on a plaque molded from a mold with a polished surface. Preferably, the rubber-modified monovinylidene aromatic copolymer of the present invention has an inherent gloss or $Gloss_{bottom}$, equal to or less than about 25 percent, more preferably equal to or less than about 20 percent, and even more preferably equal to or less than about 17 percent.

In a molded article with texture and/or grain, poor replication of texture and/or grain can result in a glossier appearance. If the texture and/or grain is replicated well in some areas of the molded article and not as well in other areas of the molded article, an inconsistent gloss appearance across the article results. This inconsistency in gloss is aesthetically unacceptable for many molded article applications such as automobile interior parts. Rubber particle size can be important in maintaining a consistent gloss under conditions or at part locations where the replication of the texture and/or grain is poor. While deficiencies in mold replication may be to some extent compensated by the inherent gloss of the material, good replication of the texture and/or grain is desirable for a very low gloss appearance which is consistent across the surface of a fabricated article. The ability of a material to replicate a texture in a mold partially is, like intrinsic gloss, the result of molding conditions under which the article is manufactured. However, for a given molding condition, the Applicants have determined that the material's viscoelastic behavior, specifically its storage modulus (denoted as G'), is a major contributing factor to consistent low gloss across an injection molded part.

Storage modulus is the ratio of shear stress to strain (deformation) when dynamic. (sinusoidal) deformation is applied and G' values discussed hereinafter, and unless otherwise noted, are measured on parallel plate fixtures in a dynamic mechanical spectrometer. G' relates to the elasticity of the polymer melt. Melt elasticity results from the desire of a polymer to maintain a preferred random coil state. When a viscoelastic polymer is deformed, low molecular weight polymer may flow easily back to the random coil state, as polymer mobility is a function of chain length and structure in the melt (for example, chain entanglements). High molecular weight polymer is less mobile, more highly entangled and will store the energy rather than lose it to viscous flow. Structure in a polymer melt comes from entanglements, cross-linking, branching, or the ordering of a block copolymer. G", the loss modulus, also determined in dynamic (sinusoidal) measurements relates to the viscous behavior. So, G' and G" together give an idea of the dual nature of the polymer melt (partly elastic solid and partly viscous fluid).

Measurements of G' and G" provide information on polymer structure and might be related to molecular weight distribution, cross-linking, etc. A good discussion of storage modulus can be found in *Polymer Rheology* (Marcel Dekker, Inc.), Lawrence Nielsen, New York, 1977 and *Encyclopedia of Polymer Science and Engineering*, Volume 16 (Wiley & Sons), second edition, pages 117 to 132, 1989. G' can be determined by Dynamic Mechanical Analysis (DMA) and G' values are generally reported in Pascals (Pa).

The G' of the rubber-modified monovinylidene aromatic copolymer of the present invention is preferably equal to or greater than about 2,000 Pa, alternatively equal to or greater than about 2,500 Pa and alternatively equal to or greater than about 3,000 Pa. The G' of the rubber-modified monovinylidene aromatic copolymer of the present invention is preferably equal to or less than about 5,000 Pa, alternatively equal to or less than about 4,500 Pa and alternatively equal to or less than about 4,000 Pa.

Preferably, injection molded articles having texture and/or grain comprising the rubber-modified monovinylidene aromatic copolymer of the present invention, when inspected visually, demonstrate minimal gloss gradients across the part, more preferably no gloss gradients across the part.

A polymer's molecular weight is directly related to the entanglement effects contributing to its rheological properties. The molecular weight of the matrix copolymer produced in the grafting reactor during the production of the rubber-modified monovinylidene aromatic copolymer of the present invention can be adjusted by the addition of a suitable chain transfer agent. Chain transfer agents, or molecular weight regulators, are substances which can undergo atom or group transfer or an addition-elimination. Organic molecules with labile hydrogens and are well known, for example, alpha-methyl styrene dimer, mercaptans or thiols such as n-dodecylmercaptan (nDM) and thioglycolate, disulfides, dithiauram disulfides, monosulfides, halides or halocarbons, common solvents and certain unsaturated compounds such as allyl peroxides, allyl halides, allyl sulfides, thioglycolates, and terpenes such as terpinoline. Also transition metal complexes as cobalt(II) porphyrin complexes can be used as transfer agent. Chain transfer agents are added in an amount from about 0.00001 to 10 weight percent based on the weight of the reaction mixture (that is, rubber, monomer(s), and solvent, if any). Preferably, the chain transfer agent in the present invention is added in an amount equal to or greater than about 0.001 weight percent, preferably 0.002, and more preferably, 0.003 weight percent based on the weight of the reaction mixture. Preferably, the chain transfer agent in the present invention is added in an amount equal to or less than about 0.5 weight percent, preferably 0.4, and more preferably, 0.3 weight percent based on the weight of the reaction mixture.

The chain transfer agent may be added all at once in one reactor zone or preferably, it may be added in two or more reactor zones. Chain transfer agent may be added before phase inversion/during rubber particle sizing, more may be added after particle sizing to help control the matrix molecular weight, and optionally more may be added later to fine tune the matrix molecular weight/molecular weight distribution. If the amount of chain transfer agent is added at the beginning of the polymerization in the present invention (in other words, at a time where the percent solids for the reaction mixture is equal to the weight percent rubber) it is added in a first amount equal to or greater than 0 weight percent, preferably between about 0.002 and about 0.02 weight percent, and more preferably between about 0.003 and about 0.01 weight percent based on the weight of the reaction mixture. The amount of chain transfer agent added later, for example between about 30 to about 40 percent solids, preferably 35 percent solids, is added in a second amount equal to or greater than about 0.03 weight percent, preferably between about 0.03 and about 0.1 weight percent, more preferably between about 0.03 and about 0.3 weight percent, and even more preferably, between about 0.1 and about 0.3 weight percent based on the weight of the reaction mixture. If more chain transfer agent is added, for example between about 40 to about 50 percent solids, preferably 45 percent solids, it is added in a third amount equal to or greater than about 0.03 weight percent, preferably between about 0.03 and about 0.05 weight percent, more preferably between about 0.03 and about 0.1 weight percent, and even more preferably, between about 0.05 and about 0.1 weight percent based on the weight of the reaction mixture. For example in the process of the present invention, chain transfer agent may be added in an amount from about 0 to 0.05 weight percent at the beginning of the polymerization, between about 0.03 to 0.3 weight percent at about 35 percent solids and between about 0.03 to 0.3 weight percent at 45 percent solids. Weight percent chain transfer agent is based on the weight of the total reaction mixture weight which is the weight of the rubber, monomer(s), and solvent if employed.

The molecular weight of the matrix copolymer in the rubber-modified monovinylidene aromatic copolymer of the present invention depends on, among other things, how much chain transfer agent is used and when it is added. Preferably, the amount of chain transfer agent and when it is added to the process for making the rubber-modified monovinylidene aromatic copolymer of the present invention, is such that the weight average molecular weight ($M_w$) of the matrix copolymer is equal to or greater than about 90, preferably equal to or greater than about 100, and most preferably equal to or greater than about 110. Preferably, the amount of chain transfer agent and when it is added to the process for making the rubber-modified monovinylidene aromatic copolymer of the present invention, is such that the weight average $M_w$, of the matrix copolymer is equal to or less than about 150, preferably equal to or less than about 135, more preferably equal to or less than about 125, and most preferably equal to or less than about 120. Matrix molecular weight, unless otherwise specified, is weight average molecular weight and is measured by gel permeation chromatography (GPC) using narrow molecular weight polystyrene standards, and is given in units of kilogram per mole (kg/mole).

Monovinylidene aromatic monomers include but are not limited to those described in U.S. Pat. Nos. 4,666,987; 4,572,819 and 4,585,825, which are herein incorporated by reference. Preferably, the monomer is of the formula:

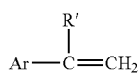

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Preferred monovinylidene aromatic monomers include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof.

Typically, such monovinylidene aromatic monomer will constitute from an amount equal to or greater than about 50 weight percent, preferably from an amount equal to or greater than about 60 weight percent, more preferably from an amount equal to or greater than about 65 weight percent, and most preferably from an amount equal to or greater than about 70 weight percent based on the total weight of the matrix copolymer. Typically, such monovinylidene aromatic monomer will constitute less than or equal to about 95 weight percent, preferably less than or equal to about 85 weight percent, more preferably less than or equal to about 80 weight percent, and most preferably less than or equal to about 75 weight percent based on the total weight of the matrix copolymer.

Unsaturated nitriles include, but are not limited to, acrylonitrile, methacrylonitrile, ethacrylonitrile, fumaronitrile and mixtures thereof. The unsaturated nitrile is generally employed in the matrix copolymer in an amount equal to or greater than about 5 weight percent, preferably in an amount equal to or greater than about 10 weight percent, more preferably in an amount equal to or greater than about 15 weight percent, and most preferably in an amount equal to or greater than about 20 weight percent based on the total weight of the matrix copolymer. The unsaturated nitrile is generally employed in the matrix copolymer in an amount less than or equal to about 50 weight percent, preferably equal to or less than about 45 weight percent, more preferably less than or equal to about 35 weight percent, and most preferably less than or equal to about 30 weight percent based on the total weight of the matrix copolymer.

Other vinyl monomers may also be included in polymerized form in the matrix copolymer, including conjugated 1,3 dienes (for example, butadiene, isoprene, etc.); alpha- or beta-unsaturated monobasic acids and derivatives thereof (for example, acrylic acid, methacrylic acid, etc., and the corresponding esters thereof such as methylacrylate, ethylacrylate, n-butyl acrylate, iso-butyl acrylate, methyl methacrylate, etc.); vinyl halides such as vinyl chloride, vinyl bromide, etc.;

vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (NPMI), etc.; and the like. These additional comonomers can be incorporated in to the composition in several ways including, interpolymerization with the monovinylidene aromatic and ethylenically unsaturated nitrile matrix copolymer and/or polymerization into polymeric components which can be combined, for example, blended in to the matrix. If present, the amount of such comonomers will generally be equal to or less than about 20 weight percent, more preferably equal to or less than about 10 weight percent and most preferably less than or equal to about 5 weight percent based on the total weight of the matrix copolymer.

The matrix copolymer is present in an amount equal to or greater than about 60 weight percent, preferably equal to or greater than about 70 weight percent, more preferably equal to or greater than about 75 weight percent, even more preferably equal to or greater than about 80 weight percent and most preferably equal to or greater than about 82 weight percent based on the weight of the rubber-modified monovinylidene aromatic copolymer. The matrix copolymer is present in an amount equal to or less than about 90.5 weight percent, preferably equal to or less than about 90 weight percent, more preferably equal to or less than about 89 weight percent, and most preferably equal to or less than about 88 weight percent based on the weight of the rubber-modified monovinylidene aromatic copolymer.

Various rubbers are suitable for use in the present invention. The rubbers include diene rubbers, ethylene propylene rubbers, ethylene propylene diene (EPDM) rubbers, ethylene copolymer rubbers, acrylate rubbers, polyisoprene rubbers, halogen containing rubbers, and mixtures thereof. Also suitable are interpolymers of rubber-forming monomers with other copolymerizable monomers.

Preferred rubbers are diene rubbers such as polybutadiene, polyisoprene, polypiperylene, polychloroprene, and the like or mixtures of diene rubbers, that is, any rubbery polymers of one or more conjugated 1,3-dienes, with 1,3-butadiene being especially preferred. Such rubbers include homopolymers and copolymers of 1,3-butadiene with one or more copolymerizable monomers, such as monovinylidene aromatic monomers as described hereinabove, styrene being preferred. Preferred copolymers of 1,3-butadiene are block or tapered block rubbers of at least about 30 weight percent 1,3-butadiene rubber, more preferably from about 50 weight percent, even more preferably from about 70 weight percent, and most preferably from about 90 weight percent 1,3-butadiene rubber and up to about 70 weight percent monovinylidene aromatic monomer, more preferably up to about 50 weight percent, even more preferably up to about 30 weight percent, and most preferably up to about 10 weight percent monovinylidene aromatic monomer, weights based on the weight of the 1,3-butadiene copolymer.

Linear block copolymers can be represented by one of the following general formulas:

S-B;

$S_1$-B-$S_2$;

$B_1$-$S_1$-$B_2$-$S_2$;

in which S, $S_1$, and $S_2$ are non-elastic polymer blocks of a monovinylidene aromatic monomer, with equal or different molecular weights and B, $B_1$, and $B_2$ are elastomeric polymer blocks based on a conjugated diene, with equal or different molecular weights. In these linear block copolymers, the non-elastic polymer blocks have a molecular weight of between 5,000 and 250,000 and the elastomeric polymer blocks have a molecular weight of between 2,000 and 250,000. Tapered portions can be present among the polymer blocks, S, $S_1$, and $S_2$ and B, $B_1$, and $B_2$. In the tapered portion the passage between the blocks B, $B_1$, and $B_2$ and S, $S_1$, and $S_2$ can be gradual in the sense that the proportion of monovinylidene aromatic monomer in the diene polymer increases progressively in the direction of the non-elastomeric polymer block, whereas the portion of conjugated diene progressively decreases. The molecular weight of the tapered portions is preferably between 500 and 30,000. These linear block copolymers are described for example in U.S. Pat. No. 3,265,765 and can be prepared by methods well known in the art. Further details on the physical and structural characteristics of these copolymers are given in B. C. Allport et al. "Block Copolymers", Applied Science Publishers Ltd., 1973.

The rubbers preferably employed in the practice of the present invention are those polymers and copolymers which exhibit a second order transition temperature, sometimes referred to as the glass transition temperature (Tg), for the diene fragment which is not higher than 0° C. and preferably not higher than −20° C. as determined using conventional techniques, for example, ASTM Test Method D 746-52 T. Tg is the temperature or temperature range at which a polymeric material shows an abrupt change in its physical properties, including, for example, mechanical strength. Tg can be determined by differential scanning calorimetry (DSC).

The rubber in the rubber-modified monovinylidene aromatic copolymer of the present invention is present in an amount equal to or greater than about 9.5 weight percent, preferably equal to or greater than about 10 weight percent, more preferably equal to or greater than about 11 weight percent, and even more preferably equal to or greater than about 12 weight percent based on the weight of the rubber-modified monovinylidene aromatic copolymer. The rubber in the rubber-modified monovinylidene aromatic copolymer of the present invention is present in an amount equal to or less than about 40 weight percent, preferably equal to or less than about 30 weight percent, more preferably equal to or less than about 25 weight percent, even more preferably equal to or less than about 20 weight percent, and most preferably equal to or less than about 18 weight percent based on the weight of the rubber-modified monovinylidene aromatic copolymer.

Preferred structures for the rubber dispersed in the matrix copolymer are one or more branched rubber, one or more linear rubber or combinations thereof. Branched rubbers, as well as methods for their preparation, are known in the art. Representative branched rubbers and methods for their preparation are described in Great Britain Patent No. 1,130,485 and in *Macromolecules*, Vol. II, No. 5, pg. 8, by R. N. Young and C. J. Fetters.

A preferred branch rubber is a radial or star-branched polymer, commonly referred to as polymers having designed branching. Star-branched rubbers are conventionally prepared using a polyfunctional coupling agent or a polyfunctional initiator and have three or more polymer segments sometimes referred to as arms, preferably between three to eight arms, bonded to a single polyfunctional element or compound, represented by the formula (rubber polymer segment-)$_k$Q wherein preferably, k is an integer from 3 to 8, and Q is a moiety of a polyfunctional coupling agent. Organometalic anionic compounds are preferred polyfunctional initiators, particularly lithium compounds with $C_{1-6}$ alkyl, $C_6$ aryl, or $C_{7-20}$ alkylaryl groups. Tin-based and polyfunctional organic coupling agents are preferably employed; silicon-based polyfunctional coupling agents are most preferably employed. The arms of the star-branched rubber are preferably one or more 1,3-butadiene rubber, more preferably they are all the same type of 1,3-butadiene rubber, that is, 1,3-butadiene tapered block copolymer(s), 1,3-butadiene block copolymer(s) or 1,3-butadiene homopolymer(s) or a combination thereof.

Methods for preparing star-branched or radial polymers having designed branching are well known in the art. Methods for preparing a polymer of butadiene using a coupling agent are illustrated in U.S. Pat. Nos. 4,183,877; 4,340,690; 4,340,691 and 3,668,162, whereas methods for preparing a polymer of butadiene using a polyfunctional initiator are described in U.S. Pat. Nos. 4,182,818; 4,264,749; 3,668,263 and 3,787,510, all of which are herein incorporated by reference. Other star-branched rubbers useful in the composition of the present invention include those taught in U.S. Pat. No. 3,280,084 and U.S. Pat. No. 3,281,383, which are incorporated herein by reference.

Linear rubbers, as well as methods for their preparation, are well known in the art. The term "linear rubber" refers to straight chains of polymerized monomer or comonomers which include uncoupled and dicoupled rubber wherein one or two polymeric segments or arms have been attached to a multifunctional coupling agent represented by the formula (rubber polymer segment-)$_k$Q wherein k is an integer from 1 to 2. The rubber polymer segments in a dicoupled linear rubber having the formula (rubber polymer segment-)$_2$Q, can be the same type, that is, both 1,3-butadiene homopolymers, more preferably 1,3-butadiene taper block copolymers, and most preferably 1,3-butadiene block copolymers, or they can be different, for example, one rubber polymer segment can be a 1,3-butadiene homopolymer and the other polymer segment a 1,3-butadiene block copolymer. Preferably, the linear rubber is one or more 1,3-butadiene homopolymer, more preferably one or more 1,3-butadiene tapered block copolymer, most preferably one or more 1,3-butadiene block copolymer or combinations thereof. The preferred comonomers comprising the tapered block copolymer and/or block copolymer linear rubber are styrene and butadiene.

Preferably a diene rubber used in the invention has a cis content equal to or less than 99 percent and preferably equal to or less than 97 percent. Preferably the cis content of the diene rubber will be equal to or greater than 20 percent and preferably equal to or greater than 37 percent wherein the cis weight percent is based on the weight of the diene rubber.

A preferred rubber is a 1,3-butadiene rubber having at least about 1 weight percent 1,2-vinyl and more preferably at least about 7 weight percent 1,2-vinyl based on the weight of the 1,3-butadiene rubber. Preferably the 1,3-butadiene rubber has less than or equal to about 30 weight percent 1,2-vinyl and more preferably less than or equal to about 13 weight percent 1,2-vinyl based on the weight of the 1,3-butadiene rubber.

A preferred rubber is a diene rubber having a weight average molecular weight of at least about 100 kilogram per mole (kg/mole) and more preferably having a weight average molecular weight of at least about a 200 kg/mole. Preferably the diene rubber has a weight-average molecular weight equal to or less than about 900 kg/mole and more preferably a weight average molecular weight equal to or less than 600 kg/mole.

A preferred rubber is a diene rubber having a solution viscosity of at least 10 centi Stokes (Cst) (10% solution in styrene) and more preferably a solution viscosity of about 20 Cst. Preferably the diene rubber has a solution viscosity equal to or less than about 500 Cst and more preferably equal to or less than about 400 Cst.

The rubber, with graft and/or occluded polymers if present, is dispersed in the continuous matrix phase as discrete particles. The rubber particles may comprise a range of sizes having a mono-modal, bimodal, or multimodal distribution. The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles.

There are a variety of methods to determine average rubber particle size, for example two methods are a light scattering method and a Coulter Counter method. Different methods may provide different results. Therefore, unless otherwise specified, the preferred rubber particle sizes disclosed and claimed herein are determined by the Coulter Counter method which is disclosed hereinafter. The average particle size of the rubber particles is equal to or greater than about 1 micrometer (μm), preferably equal to or greater than about 1.25 μm, more preferably equal to or greater than about 1.5 μm, and most preferably equal to or greater than about 1.6 μm. The average particle size of the rubber particles is equal to or less than about 2 μm, preferably equal to or less than about 1.9 μm, and more preferably equal to or less than about 1.8 μm. Rubber particle sizes too small or too large can result in inadequate impact properties.

Preferably the impact resistance of the rubber-modified monovinylidene aromatic copolymer composition of the present invention, as determined by Notched Charpy method, ISO 179 is equal to or greater than about 8 kilo Joule per square meter ($kJ/m^2$), more preferably equal to or greater than about 11 $kJ/m^2$, even more preferably equal to or greater than about 15 $kJ/m^2$, and most preferably equal to or greater than about 20 $kJ/m^2$.

Rubber cross-linking is quantified by the light absorbance ratio (LAR). In the rubber-modified copolymer of the present invention, it is preferred that the rubber particles have a light absorbance ratio preferably equal to or greater than about 0.1, more preferably equal to or greater than about 0.2, and most preferably equal to or greater than about 0.3. The preferred light absorbance ratio of the dispersed phase is less than or equal to about 0.9, preferably less than or equal to about 0.8, more preferably less than or equal to about 0.7, and most preferably less than or equal to 0.6. Light absorbance ratio is the ratio of light absorbance for a suspension of the rubber particles in dimethylformamide to the light absorbance for a suspension of the rubber particles in dichloromethane, as described in the examples hereinbelow.

The light absorbance ratio, which is a measure for degree of crosslinking, is dependent on the amount and kind of the polymerization initiator and the temperature and the residence time at the removal step for the volatile components. It also depends on the types and amounts of the matrix monomers; antioxidant, chain transfer agent, etc. A suitable light absorbance ratio can be set by a person skilled in the art by choosing the appropriate conditions for the production process in accordance with the trial and error method.

The rubber-modified monovinylidene aromatic copolymer composition of the present invention can be employed in mixtures, alloys or blends with other polymer and/or copolymer resins, for example, mixtures with nylons, polysulfones, polyethers, polyether imides, polyphenylene oxides, polycarbonates or polyesters. A preferred blend is polycarbonate and a mass ABS of the present invention (PC/ABS). In addition, the claimed rubber-modified monovinylidene aromatic copolymer composition may also optionally contain one or more additives that are commonly used in compositions of this type. Preferred additives of this type include, but are not limited to: fillers, reinforcements, ignition resistant additives, stabilizers, colorants, antioxidants, antistats, impact modifiers (such as emulsion ABS, polyolefin elastomers, methylmethacrylate, butadiene, and styrene (MBS) terpolymers, acrylate rubbers, and the like), silicon oils, flow enhancers, mold releases, etc. Preferred examples of additives are fillers, such as, but not limited to talc, clay, wollastonite, mica, glass or a mixture thereof. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize mass polymerized rubber-modified monovinylidene aromatic copolymer compositions against degradation caused by, but not limited to heat, light, and oxygen, or a mixture thereof may be used.

If used, such additives may be present in an amount from at least about 0.01 percent by weight, preferably at least about 0.1 percent by weight; more preferably at least about 1 percent by weight, more preferably at least about 2 percent by weight, and most preferably at least about 5 percent by weight based on the weight of the rubber-modified monovinylidene aromatic copolymer composition. Generally, the additive is present in an amount less than or equal to about 25 percent by weight, preferably less than or equal to about 20 percent by weight, more preferably less than or equal to about 15 percent by weight, more preferably less than or equal to about 12 percent by weight, and most preferably less than or equal to about 10 percent by weight based on the weight of the rubber-modified monovinylidene aromatic copolymer composition.

The rubber-modified monovinylidene aromatic copolymer composition of this invention is thermoplastic. When softened or melted by the application of heat, the compositions of this invention can be formed or molded using conventional techniques such as compression molding, gas assisted injection molding, calendering, vacuum forming, thermoforming, extrusion and/or blow molding, alone or in combination, preferably injection molding.

Some of the fabricated articles include molded articles requiring a consistent low gloss surface with texture and/or grain such as an extruded sheet or an injection molded parts, especially interior automotive trim parts and information technology equipment parts, such as enclosures for computers, computer peripherals, printers, copiers, personal data assistants (PDAs), cellular phones, and the like.

EXAMPLES

To illustrate the practice of this invention, examples of preferred embodiments are set forth below. However, these examples do not in any manner restrict the scope of this invention.

The compositions of Examples 1 to 10 are mass produced acrylonitrile butadiene styrene terpolymer resins wherein 10.2 weight percent rubber is dissolved in 53.3 weight percent styrene, 17.5 weight percent acrylonitrile, 19 weight percent ethylbenzene, and optionally N-phenyl maleimide to form a reaction feed stream. The mixture is polymerized in continuous process while agitating said mixture. The polymerization occurred in a multi staged reactor system over an increasing temperature profile. During the polymerization process, some of the forming copolymer grafts to the rubber molecules while some of it does not graft, but instead, form the matrix copolymer.

A continuous polymerization apparatus composed of four plug flow reactors connected in series, wherein each plug flow reactor is divided in three zones of equal size, each zone having a separate temperature control and equipped with an agitator, is continuously charged in zone 1 with a feed of 17.8 g/hr composed of a rubber component, styrene, acrylonitrile, and ethyl benzene, at such a rate that the total residence time in the apparatus is approximately 7 hours. 1,1-di(t-butyl peroxy)cyclohexane (TRIGONOX™ 22 initiator) is added to the feed line to the first reactor, n-dodecylmercaptan (nDM) (chain transfer agent) is added to different zones to optimize the rubber particle sizing and the matrix molecular weight. Table 1 contains further details with respect to feed composition and reaction conditions. After passing through the four reactors, the polymerization mixture is guided to a separation and monomer recovery step using a preheater followed by a devolatilizer. The molten resin is stranded and cut in granular pellets. The monomers and ethyl benzene are recycled and fed to the polymerization apparatus.

Temperatures for (a) the four reactors are: reactor 1: (Zone 1, 108° C.), (Zone 2, 110° C.), and (Zone 3, 114° C.); reactor 2: (Zone 4, 117° C.), (Zone 5, 119° C.), and (Zone 6 121° C.); reactor 3: (Zone 7, 124° C.), (Zone 8, 131° C.), and (Zone 9, 141° C.), and reactor 4: (Zone 10, 152° C.), (Zone 11, 162° C.), and (Zone 12, 173° C.). Agitation is set for each of the reactors at 100, 110, 50, and 10 revolutions per minute (RPM) for reactors 1 to 4, respectively. Samples are tested at the end of each reactor to determine percent conversion and are expressed as percent solids based on the weight of the reaction mixture.

The pellets are used to prepare physical property test specimens (other than gloss test specimens) on a Toyo 90 ton injection molding machine having the following molding conditions: Melt temperature of 260° C.; Mold temperature of 77° C.; Holding pressure of 9000 pounds per square inch (psi); Injection time of 1.63 seconds; Hold time of 30 seconds; Cooling time of 60 seconds; and Cycle time of 60 seconds.

The formulation content, product characteristics and properties of examples 1 to 10 are given in Table 1 below. Weight percents are based on the weight of the rubber-modified monovinylidene aromatic copolymer composition. In Table 1:

"TRIGONOX 22" is 1,1-di(t-butyl peroxy)cyclohexane available from Ciba Specialty Chemicals;

"NPMI" is a 40 percent solution of N-phenyl maleimide in acrylonitrile;

"nDM" is n-dodecylmercaptan a chain transfer agent;

"PB" is a low-cis polybutadiene with 57 Mooney viscosity available as Dow BSL PB5901;

"$M_{w\ Matrix}$" is the weight average molecular weight for the matrix copolymer measured by gel permeation chromatography using narrow molecular weight polystyrene standards, determinations and a refractive index (RI) detector;

"$RPS_{LS230}$" is the rubber particle size determined by a light scattering method using a Beckman Coulter Particle Characterization LS-230 instrument and LS230 Beckman Particle Characterization software, version 3.01: wherein 6-8 granules of polymer sample is dissolved in approximately 10 ml DMF and sonicated for a minimum of 15 minutes. The following optical model parameter values are used: Fluid refractive index ($\eta$fluid)—1.431, Sample "real" refractive index ($\eta$sample/real)—1.570, and Sample "imaginary" refractive index ($\eta$sample/imaginary)—0.01. Drops of dissolved sample are added until sample obscuration is in the 45.0 to 55.0 percent range. The mean volume average particle size is reported;

"$RPS_{CC}$" is the rubber particle size reported as determined on a Coulter Multisizer II or IIe with the ACCUCOMP™ Software Version 2.01. by the following method: about 3 granules of polymer samples (30-70 mg) are dissolved in 5 ml of DMF, using an ultrasonic bath for agitation for approximately 15 to 20 minutes. 10 ml of an electrolyte solution (1 percent $NH_4SCN$ in DMF) is mixed with 0.2 ml of the sample solution. Use coulter measuring stand with 20 μm Coulter tube and a 1.16 μm calibration material. The coincidence level indicator of the apparatus should read between 5 and 10 percent. If the reading is above 10 percent, dilute the sample solution in the beaker with electrolyte solution, or, if it is too low, add more drops of the polymer solution in DMF. The volumetric mean particle size is reported.

"$M_{n\ Matrix}$," is the number average molecular weight for the matrix copolymer measured by gel permeation chromatography using narrow molecular weight polystyrene standards, determinations were made with a UV RI detector;

"$PBD_{ftir}$" is the polybutadiene content in the rubber-modified monovinylidene aromatic copolymer composition which is measured by Fourier Transform infrared spectroscopy and reported in weight percent bases on the weight of the rubber-modified monovinylidene aromatic copolymer composition;

"$AN_{ftir}$" is the acrylonitrile content in the rubber-modified monovinylidene aromatic copolymer composition which is measured by Fourier Transform infrared spectroscopy and reported in weight percent bases on the weight of the rubber-modified monovinylidene aromatic copolymer composition;

"$NPMI_{ftir}$" is the N-phenyl maleimide content in the rubber-modified monovinylidene aromatic copolymer composition which is measured by Fourier Transform infrared spectroscopy and reported in weight percent bases on the weight of the rubber-modified monovinylidene aromatic copolymer composition;

and

"LAR" is the light absorbance ratio determined using a Brinkmann model PC 800 probe colorimeter equipped with a 450 nm wavelength filter, from Brinkmann Instruments Inc., Westbury, N.Y., or equivalent, is used. In a first vial, a 0.4 gram (g) sample of rubber-modified copolymer is dissolved in 40 milliliters (ml) of dimethylformamide (DMF). From the first vial, 5 ml of the resulting DMF solution is added to a second vial containing 40 ml of DMF. From the first vial, 5 ml of the resulting DMF solution is added to a third vial containing 20 ml of dichloromethane (DCM). The probe is zeroed in neat DMF. The absorption of the DMF solution in the second vial and the absorption of the DCM solution in the third vial are determined. The light absorbance ratio is calculated by the following equation:

$$LAR = \frac{(\text{Absorbance of Sample in } DMF)}{(\text{Absorbance of Sample in } DCM)}$$

The grain 60 Degree gloss specimens are molded on a Demag Ergotech 100 injection molding machine. Plaques are molded under two different conditions referred to as "Grain $Gloss_{top}$" and "Grain $Gloss_{bottom}$". The two conditions differ only in injection speed. Grain $Gloss_{top}$ condition has an injection speed of 60 min/sec resulting in a fill time of about 0.51 sec and an overall cycle time of 38 sec. Grain $Gloss_{bottom}$ condition has an injection speed of 5 mm/sec with a fill time of about 5.5 sec and an overall cycle time of about 43 sec. The following molding conditions are the same for both Grain $Gloss_{top}$ conditions and Grain $Gloss_{bottom}$ conditions: Barrel temperature settings from the hopper of 50, 235, 240, 245, and 250° C.; Nozzle temperature of 250° C., Mold temperature (both sides) of 50° C.; Back pressure: 7 bar; Holding pressure 56 bar; Holding time 4 seconds; Cavity switch pressure: 200 bar; Cooling time: 30 seconds; and injection speed: 10 cubic centimeters per second ($cm^3/s$).

The non-grain 60 Degree gloss specimens are molded on a 28 metric ton Arburg molding machine. Plaques are molded under two different conditions referred to as "$Gloss_{bottom}$" and "$Gloss_{top}$". The two conditions differ in molding temperatures, hold pressure and hold time. The $Gloss_{bottom}$ condition has a melt temperature of 235° C., a mold temperature of 30° C., hold pressure of 700 psi and a hold time of 0.1 sec. The $Gloss_{top}$ condition has a melt temperature of 250° C., a mold temperature of 42° C., a hold pressure of 475 psi and a hold time of 7.0 sec. The following molding conditions are the same for both $Gloss_{bottom}$ conditions and $Gloss_{top}$ conditions: Back pressure is 50 psi, Screw Speed is 1.1 sec, and overall cycle time is 38 sec.

Before molding, the materials are dried for two hours at 80° C. Gloss is measured in the center of the plaque. The materials are injected through one injected point located in the middle of the short side of the mold. The mold surface is produced by a mold insert. For the plaques with no texture, the mold insert is a polished surface.

The following tests are run on Example 1 to 10 and the results of these tests are shown in Table 1:

"G'" is storage modulus as determined on a Rheometrics ARES rheometer (Orchestrator software version 6.5.6), running a temperature ramp on parallel plate fixtures. Samples were compression molded at 200° C. The temperature was ramped from 135 to 250° C. at a rate of 3 degrees per minute and measurements were taken using a shear rate of 1.0 radian/second. The G' was recorded at 120 degrees C. above the matrix Tg. The matrix Tg was defined via a solid state temperature ramp, run in torsion, on the DMS. The tan delta peak value was recorded as the transition temperature. The temperature ramp defining Tg was run from 70 to ~140° C. at a ramp rate of 3 degrees per minute and at a shear rate of 1.0 radian/second;

"Grain $Gloss_{bottom}$" is determined by 60° Gardner gloss on specimens prepared from $Gloss_{bottom}$ conditions (described hereinabove) molded on a textured plaque with a grain surface of about 7.8 microns and measuring about 8 cm×10 cm×3 mm, 30 minutes after molding, according to ISO 2813 with "Dr. Lange RB3" reflectometer;

"Grain $Gloss_{top}$" is determined by 60° Gardner gloss on specimens prepared from $Gloss_{top}$ conditions (described hereinabove) molded on a textured plaque with a grain surface of about 7.8 microns and measuring about 8 cm×10 cm×3 mm, 30 minutes after molding, according to ISO 2813 with "Dr. Lange RB3" reflectometer;

"Delta Grain Gloss" is the absolute value of the difference between Grain $Gloss_{top}$ minus Grain $Gloss_{bottom}$:

Delta Grain Gloss=|Grain $Gloss_{top}$−Grain $Gloss_{bottom}$|

"$Gloss_{bottom}$" is determined by 60° Gardner gloss on specimens prepared from Bottom Gloss conditions (described hereinabove) molded on a smooth surface plaque measuring 30 mm×64 mm, 30 minutes after molding, according to ASTM D 2457 with A BYK Gardner micro-tri gloss meter reflectometer;

"$Gloss_{top}$" is determined by 60° Gardner gloss on specimens prepared from $Gloss_{top}$ conditions (described hereinabove) molded on a smooth surface plaque measuring 30 mm×64 mm, 30 minutes after molding, according to ASTM D 2457 with A BYK Gardner micro-tri gloss meter reflectometer;

"Tensile Yield", "Tensile Break Elongation" and "Tensile Modulus" are performed in accordance with ISO 527-2. Tensile Type 1 test specimens are conditioned at 23° C. and 50 percent relative humidity 24 hours prior to testing. Testing is performed at 23° C. using a Zwick 1455 mechanical tester;

"MFR @ 220° C. and 10 kg" melt flow rate is determined according to ISO 1133 on a Zwick 4105 01/03 plastometer at 220° C. and an applied load of 10 kg, samples are conditioned at 80° C. for 2 hours before testing;

"Notched Charpy$_{23°\ C.}$" impact resistance is determined according to DIN 53453 at 23° C.; and "Vicat" softening temperature is determined according to ISO 306.

The product compositions, characteristics, and properties for Comparative Examples MAGNUM™ 3416 SC and MAGNUM 3525 MT, both available from The Dow Chemical Company and Example 11 are shown in Table 2. Examples MAGNUM 3416 SC and MAGNUM 3525 MT contain 6.25 percent carbon black concentrate in an ABS carrier. Example 11 is Example 10 containing 6.25 percent carbon black concentrate in an ABS carrier.

The colored-grain 60 Degree gloss specimens are molded on a Krauss Maffei 250T injection molding machine. Plaques are molded under two different conditions referred to as "Colored-Grain Gloss$_{bottom}$" and "Colored-Grain Gloss$_{top}$". The two conditions differ in injection speed and injection time. The Colored-Grain Gloss$_{bottom}$ conditions are: Injection speed: 13 percent; and Injection time: 4.5 sec. The Colored-Grain Gloss$_{top}$ conditions are: Injection speed: 63 percent; and Injection time: 1 sec. The following molding conditions are the same for both Colored-Grain Gloss$_{bottom}$ and Colored-Grain Gloss$_{top}$ conditions: Barrel temperature profile: 250, 250, 245, and 235 (hopper)° C.; Mold temperature: 50° C.; Holding pressure: 600 bar; and holding time: 4 sec.

Before molding, the materials are dried for two hours at 80° C. Gloss is measured in the center of the plaque. The materials are injected through one injected point located in the middle of the short side of the mold. The molded plaques measure 147 mm by 208 mm by 3 mm and have a VW grain K63.

Physical property and gloss test specimens are molded as described hereinabove. As can be seen, examples of the present invention demonstrate an excellent balance of low and consistent gloss across the molded test specimen with good tensile modulus and impact properties.

TABLE 1

| | | 1* | 2* | 3 | 4 | 5* | 6 | 7 | 8 | 9 | 10 |
|---|---|---|---|---|---|---|---|---|---|---|---|
| | | | | | | Example | | | | | |
| PROCESS CONDITIONS | | | | | | | | | | | |
| Reaction feed stream rate | Kg/h | 17.8 | 17.8 | 17.8 | 17.8 | 17.8 | 17.8 | 17.8 | 17.8 | 14.14 | 17.8 |
| TRIGONOX 22 | ppm | 120 | 130 | 130 | 130 | 130 | 130 | 130 | 130 | 120 | 130 |
| nDM | | | | | | | | | | | |
| Zone 1 | ppm | 301 | 201 | 100 | 100 | 50 | 100 | 20 | 20 | 110 | 100 |
| Zone 5 | ppm | 1003 | 1004 | 1003 | 1003 | 1004 | 1003 | 1300 | 1501 | 1300 | 1003 |
| Zone 7 | ppm | 1200 | 801 | 1201 | 800 | 801 | 800 | 801 | 801 | 950 | 1200 |
| NMPI | | | | | | | | | | | |
| Zone 1 | g/hr | | | | | | | 600 | 600 | 318 | |
| Zone 2 | g/hr | | | | | | | 600 | 600 | 566 | |
| Zone 3 | g/hr | | | | | | | 600 | 600 | 566 | |
| Solids | | | | | | | | | | | |
| R1 | wt % | 21 | 20 | 22 | 21 | 22 | 23 | 22 | 24 | 25 | 22 |
| R2 | wt % | 36 | 34 | 36 | 37 | 39 | 39 | 41 | 42 | 41 | 36 |
| R3 | wt % | 49 | 42 | 49 | 45 | 51 | 52 | 49 | 51 | 52 | 49 |
| PRODUCT COMPOSITION | | | | | | | | | | | |
| PB$_{mass\ balance}$ | % | 15.0 | 14.6 | 15.1 | 15.1 | 15.1 | 14.7 | 13.7 | 13.8 | 13.7 | 15.1 |
| PBD$_{FTIR}$ | % | 13.9 | 14.3 | 14.8 | 13.8 | 16.5 | 15.1 | 14.2 | 13.8 | 12.9 | 14.4 |
| AN$_{FTIR}$ | % | 20.1 | 21.2 | 21.1 | 20.7 | 23.6 | 22.5 | 22.4 | 22.4 | 20.9 | 21.2 |
| NPMI$_{mass\ balance}$ | % | | | | | | | 3.6 | 3.6 | 3.6 | |
| NPMI$_{FTIR}$ | % | | | | | | | | | | |
| PRODUCT CHARACTERISTICS | | | | | | | | | | | |
| RPS$_{LS230}$ | μm | 8.1 | 4.4 | 2.5 | 2.6 | 1.6 | 2.6 | 2.7 | 2.3 | 2.9 | 2.5 |
| RPS$_{cc}$ | μm | 3.93 | 2.32 | 1.6 | 1.7 | 1.34 | 1.71 | 1.53 | 1.54 | 1.69 | 1.6 |
| M$_{n\ Matrix}$ | kg/mole | 39.3 | 45 | 40.7 | 50 | 42.1 | 46.1 | 46.1 | 43.9 | 43.7 | 45 |
| M$_{w\ Matrix}$ | kg/mole | 98.9 | 111.9 | 118.8 | 129 | 135.1 | 129.9 | 129.8 | 129.2 | 116.6 | 124 |
| LAR | index | 0.40 | 0.42 | 0.45 | 0.42 | 0.48 | | 0.48 | 0.54 | 0.48 | 0.45 |
| PHYSICAL PROPERTIES | | | | | | | | | | | |
| G' | Pa | 2059 | 3878 | 3634 | 2658 | 3940 | 4514 | 3627 | 4609 | 2815 | 3634 |
| Grain Gloss$_{bottom}$ | % | 4.3 | 4.8 | 5.5 | 5.6 | 6.6 | 5.5 | 6.4 | 6.6 | 5.7 | 5.5 |
| Grain Gloss$_{top}$ | % | 4.4 | 4.6 | 5.2 | 5.2 | 5.3 | 5.2 | 5.6 | 5.7 | 5.1 | 5.2 |
| Delta Grain Gloss | % | 0.1 | 0.2 | 0.3 | 0.4 | 1.3 | 0.3 | 0.8 | 0.9 | 0.5 | 0.3 |
| Gloss$_{bottom}$ | % | 10 | | 16 | 16 | 21 | 16 | 17 | 17 | 14 | 16 |
| Gloss$_{top}$ | % | 23 | | | | 53 | 35 | 39 | 41 | 33 | |
| MFR (230° C. and 3.8 kg) | g/10 min. | 21 | 16 | 17 | 15 | 14 | 10 | 11 | 11 | 14 | 17 |
| Tensile Modulus | MPa | 1140 | 1360 | 1560 | 1540 | 1690 | 1480 | 1630 | 1650 | 1530 | 1560 |
| Tensile Yield Stress | MPa | 23 | 28 | 32 | 32 | 35 | 33 | 36 | 36 | 34 | 32 |
| Tensile Break Elongation | % | 45 | 75 | 40 | 53 | 14 | 64 | 14 | 15 | 14 | 40 |
| Vicat | ° C. | 94 | 95 | 96 | 96 | 96 | 98 | 104 | 103 | 103 | 96 |
| Notched Charpy$_{23°\ C.}$ | kJ/m² | 12 | 15 | 16 | 18 | 21 | 20 | 16 | 13 | 12 | 16 |

*Not examples of the present invention

TABLE 2

| | | Example | | |
|---|---|---|---|---|
| | | MAGNUM 3416 SC* | MAGNUM 3525 MT* | 11 |
| PRODUCT COMPOSITION | | | | |
| $PBD_{FTIR}$ | % | 12.5 | 14.5 | 14.4 |
| $AN_{FTIR}$ | % | 23.5 | 24.5 | 21.2 |
| $NPMI_{FTIR}$ | % | | | 3.4 |
| PRODUCT CHARACTERISTICS | | | | |
| $RPS_{LS230}$ | μm | 1.0 | 0.9 | 2.5 |
| $RPS_{cc}$ | μm | 1.0 | 0.8 | 1.6 |
| $M_{w\,Matrix}$ | kg/mole | 146 | 136 | 124 |
| PHYSICAL PROPERTIES | | | | |
| G' | Pa | 5178 | 5132 | 3634 |
| Colored-Grain $Gloss_{bottom}$ | % | 3.8 | 3.6 | 3.0 |
| Colored-Grain $Gloss_{top}$ | % | 3.2 | 3.0 | 3.0 |
| Delta Grain Gloss | % | 0.6 | 0.6 | 0 |
| Tensile Modulus | MPa | 2200 | 2200 | 1560 |
| Notched $Charpy_{23°\,C.}$ | $kJ/m^2$ | 14 | 15 | 16 |

*Not examples of the present invention

The invention claimed is:

1. A mass polymerized rubber-modified monovinylidene aromatic copolymer composition comprising:
   (i) a continuous matrix phase comprising a copolymer of a monovinylidene aromatic monomer and an ethylenically unsaturated nitrile monomer and a comonomer that is N-phenyl malelmide having a weight average molecular weight of equal to or less than 150 kg/mole and
   (ii) a rubber component dispersed as discrete rubber particles in the matrix comprising polybutadiene content of at least 12 weight percent as determined by infrared analysis,
   wherein the rubber-modified monovinylidene aromatic copolymer has a storage modulus (G') of between 2,000 to 5,000 Pascals, and has an average rubber particle size between 1.5 to 2 microns as determined by Coulter Counter, wherein when the composition is molded or extruded it exhibits a tensile modulus of at least 1,400 MPa as determined by ISO 527-2, and a notched Charpy at 23° C as determined by DIN 53453 of at least 11 $kJ/m^2$, and a delta grain gloss of between 0.3 and 0.9 as determined by 60° Gardner gloss by ISO 2813.

2. The mass polymerized rubber-modified monovinylidene aromatic copolymer composition of claim 1 wherein the ethylenically unsaturated nitrile is from about 10 to about 35 weight percent of the copolymer.

3. The mass polymerized rubber-modified monovinylidene aromatic copolymer composition of claim 1 wherein the monovinylidene aromatic monomer is styrene and the ethylenically unsaturated nitrile monomer is acrylonitrile.

4. The mass polymerized rubber-modified monovinylidene aromatic copolymer composition of claim 1 wherein:
   (iii) the copolymer is present in an amount from about 60 to 90.5 weight percent and
   (iv) the rubber component is present in an amount from about 40 to 9.5 weight percent,
   wherein weight percents are based on the total weight of the rubber-modified monovinylidene aromatic copolymer.

5. The mass polymerized rubber-modified monovinylidene aromatic copolymer composition of claim 1 wherein the polybutadiene rubber comprises a 1,3-butadiene homopolymer.

6. The mass polymerized rubber-modified monovinylidene aromatic copolymer composition of claim 1 wherein the rubber component comprises a styrene and 1,3-butadiene block copolymer rubber.

7. The mass polymerized rubber-modified monovinylidene aromatic copolymer composition or claim 1 Wherein the rubber particles have an average particle size from about 1.5 micrometers to about 1.9 micrometers.

8. The mass polymerized rubber-modified monovinyldene aromatic copolymer composition of claim 1 wherein the rubber particles have an average particle size from about 1.6 micrometers to about 2 micrometers.

9. The mass polymerized rubber-modified monovinylidene aromatic copolymer composition of claim 1 wherein the G' is between 2,000 to 4,500 Pascals.

10. The mass polymerized rubber-modified monovinylidene aromatic copolymer composition of claim 1 wherein continuous matrix phase has a weight average molecular weight of equal to or less than 135 kg/mole.

11. The mass polymerized rubber-modified monovinylidene aromatic copolymer composition of claim 1 further comprising a polycarbonate resin.

12. The mass polymerized rubber-modified monovinylidene aromatic copolymer composition of claim 11 is a polycarbonate PC)/acrylonitrlle-butadiene-styrene (ASS-ABS) blend.

13. A method for preparing a mass polymerized rubber-modified monovinylidene aromatic copolymer composition comprising the steps of:
   (a) polymerizing by bulk, mass-solution or mass-suspension polymerization techniques in the presence of a dissolved rubber component a monovinylidene aromatic monomer and an ethylenically unsaturated nitrile monomer and a comonomer that is N-phenylmaeimide, optionally in the presence of an inert solvent, forming a continuous matrix phase to the desired degree of conversion wherein
      (i) the continuous matrix phase has a weight average molecular weight of equal to or less than 150 kg/mole and
      (ii) the rubber component is dispersed as discrete rubber particles in the matrix comprising a polybutadiene content of at least 12 weight percent as determined by infrared analysis,
   (b) subjecting the resultant mixture to conditions sufficient to remove any unreacted monomers and to cross-link the rubber, and
   (c) isolating the rubber-modified monovinylidene aromatic copolymer composition,
   wherein the rubber-modified monovinylidene aromatic copolymer has a storage modulus (G') of between 2,000 to 5,000 Pascals, the average rubber particle size is between 1.5 to 2 microns as determined by Coulter Counter, a tensile modulus of at least 1,400 MPa as determined by ISO 527-2, and a notched Charpy at 23° C. as determined by DIN 53453 of at least 11 $KJ/m^2$ and a delta grain gloss of between 0.3 and 0.9 as determined by 60° Gardner gloss by ISO 2813.

14. The method of claim 13 wherein the monovinylidene aromatic monomer is styrene and the ethylenically unsaturated nitrile monomer is acrylonitrile.

15. A method for producing a molded or extruded article of a mass polymerized rubber-modified monovinylidene aromatic copolymer composition comprising the steps of:
(A) preparing a mass polymerized rubber-modified monovinylidene aromatic copolymer composition by:
  (a) polymerizing by bulk, mass-solution or mass-suspension polymerization techniques in the presence of a dissolved rubber component a monovinylidene aromatic monomer and an ethylenically unsaturated nitrile monomer and a comonomer of N-phenyl maleimide, optionally in the presence of an inert solvent, forming a continuous matrix phase to the desired degree of conversion wherein
    (i) the continuous matrix phase has a weight average molecular weight of equal to or less than 150 kg/mole and
    (ii) the rubber component is dispersed as discrete rubber particles in the matrix comprising a polybutadiene content of at least 12 weight percent as determined by infrared analysis,
  (b) subjecting the resultant mixture to conditions sufficient to remove any unreacted monomers and to cross-link the rubber, and
  (c) isolating the rubber-modified monovinylidene aromatic copolymer composition,
  wherein the rubber-modified monovinylidene aromatic copolymer has a storage modulus (G') of between 2,000 to 5,000 Pascals, the average rubber particle size is between 1.5 to 2 microns as determined by Coulter Counter, a tensile modulus of at least 1,400 MPa as determined by ISO 527-2, and a notched Charpy at 23° C. as determined by DIN 53453 of at least 11 kJ/m$^2$ and a delta grain gloss of between 0.3 and 0.9 as determined by 60° Gardner gloss by ISO 2813; and
(B) molding or extruding said rubber-modified monovinylidene aromatic copolymer composition into a molded or extruded article.

16. The method of claim 15 wherein the molded or extruded article is an automotive part, an information technology equipment part, or a sheet.

17. The composition of claim 1 in the form of a molded or extruded article.

18. The molded or extruded article of claim 17 is an automotive part, an information technology equipment part, or a sheet.

19. The composition of claim 1, wherein the continuous matrix phase is obtained from polymerization with a chain transfer agent selected from the group consisting of mercaptans and thiols.

20. The composition of claim 19, wherein the chain transfer agent is n-dodecylmercaptan.

* * * * *